United States Patent
Lin et al.

(10) Patent No.: US 10,636,277 B2
(45) Date of Patent: *Apr. 28, 2020

(54) FLEXIBLE DISPLAY DEVICE

(71) Applicant: GUANGDONG OPPO MOBILE TELECOMMUNICATIONS CORP., LTD., Dongguan, Guangdong (CN)

(72) Inventors: Yugui Lin, Guangdong (CN); Jiao Cheng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,514

(22) Filed: Jun. 9, 2019

(65) Prior Publication Data

US 2019/0297175 A1 Sep. 26, 2019

Related U.S. Application Data

(63) Continuation of application No. 16/306,595, filed as application No. PCT/CN2017/091335 on Jun. 30, 2017.

(30) Foreign Application Priority Data

Jul. 8, 2016 (CN) .......................... 2016 1 0542623

(51) Int. Cl.
*G06F 3/041* (2006.01)
*G08B 21/24* (2006.01)
(Continued)

(52) U.S. Cl.
CPC ........... *G08B 21/24* (2013.01); *G06F 1/1652* (2013.01); *G08B 3/10* (2013.01); *G08B 6/00* (2013.01);
(Continued)

(58) Field of Classification Search
CPC ...... H04M 1/0268; G06F 1/1652; G08B 3/10; G08B 6/00; G08B 7/06; G08B 21/182
See application file for complete search history.

(56) References Cited

U.S. PATENT DOCUMENTS 2,309,287 A * 1/1943 Wilson .................... A47F 7/143
40/491
2,406,272 A * 8/1946 Van Voorhees ........... E06B 9/54
160/281

(Continued)

FOREIGN PATENT DOCUMENTS

CN 104021749 9/2014
CN 104461444 3/2015
(Continued)

OTHER PUBLICATIONS

EPO, Office Action for EP Application No. 17823576.8, dated May 31, 2019.
(Continued)

*Primary Examiner* — Hai Phan
*Assistant Examiner* — Son M Tang
(74) *Attorney, Agent, or Firm* — Hodgson Russ LLP

(57) ABSTRACT

A flexible display device includes a housing, a reel, a flexible screen component, and an alarm assembly. The housing is provided with a gap in communication with an inner cavity of the housing. The reel is located in the inner cavity of the housing and rotatably coupled to the housing. The flexible screen component has a fixed end and a stretching end arranged opposite to each other, the fixed end is secured to the reel, and the stretching end extends out of the housing through the gap. The alarm assembly is accommodated in the housing, and the alarm assembly includes an alarm and a detector. The detector is electrically coupled to the alarm. The detector is configured to detect a stretched length of the flexible screen component, and the alarm is configured to be (Continued)

triggered to raise an alarm when the flexible screen component is stretched to a preset length.

13 Claims, 5 Drawing Sheets

(51) Int. Cl.
| | |
|---|---|
| *G06F 1/16* | (2006.01) |
| *H04M 1/02* | (2006.01) |
| *G08B 3/10* | (2006.01) |
| *G08B 6/00* | (2006.01) |
| *G08B 7/06* | (2006.01) |
| *G08B 21/18* | (2006.01) |
| *G09F 9/30* | (2006.01) |

(52) U.S. Cl.
CPC .............. *G08B 7/06* (2013.01); *G08B 21/182* (2013.01); *H04M 1/0268* (2013.01); *G09F 9/301* (2013.01)

(56) References Cited

U.S. PATENT DOCUMENTS

| | | | | |
|---|---|---|---|---|
| 5,009,242 | A * | 4/1991 | Prange | E03F 9/002 |
| | | | | 134/113 |
| 7,463,238 | B2 * | 12/2008 | Funkhouser | G06F 1/1601 |
| | | | | 345/107 |
| 8,009,421 | B2 * | 8/2011 | Misawa | G02F 1/133305 |
| | | | | 345/156 |
| 8,136,282 | B2 * | 3/2012 | Valeij | G09F 7/22 |
| | | | | 40/610 |
| 9,152,180 | B2 * | 10/2015 | Kim | G06F 1/1647 |
| 9,244,494 | B2 * | 1/2016 | Hinson | G06F 15/025 |
| 9,383,775 | B2 | 7/2016 | Cho et al. | |
| 9,609,225 | B2 * | 3/2017 | Kwon | G06F 3/04845 |
| 9,684,340 | B2 * | 6/2017 | Han | G06F 1/1652 |
| 2001/0008582 | A1 * | 7/2001 | Sato | G02F 1/133348 |
| | | | | 396/429 |
| 2002/0050083 | A1 * | 5/2002 | Zarelius | G09F 11/18 |
| | | | | 40/514 |
| 2002/0070910 | A1 * | 6/2002 | Fujieda | G06F 1/1615 |
| | | | | 345/85 |
| 2003/0071800 | A1 * | 4/2003 | Vincent | G02F 1/15 |
| | | | | 345/204 |
| 2004/0061683 | A1 * | 4/2004 | Mochizuki | G06F 1/1601 |
| | | | | 345/168 |
| 2009/0051830 | A1 * | 2/2009 | Matsushita | G02F 1/133305 |
| | | | | 348/836 |
| 2009/0128461 | A1 * | 5/2009 | Geldard | G06F 3/1446 |
| | | | | 345/84 |
| 2010/0182738 | A1 * | 7/2010 | Visser | G06F 1/1613 |
| | | | | 361/679.01 |
| 2012/0105370 | A1 * | 5/2012 | Moore | G06F 3/0412 |
| | | | | 345/174 |
| 2014/0204037 | A1 * | 7/2014 | Kim | G06F 1/1647 |
| | | | | 345/173 |
| 2014/0268532 | A1 | 9/2014 | Nicol et al. | |
| 2014/0333545 | A1 | 11/2014 | Lee et al. | |
| 2016/0033999 | A1 | 2/2016 | Browning | |

FOREIGN PATENT DOCUMENTS

| | | |
|---|---|---|
| CN | 104680943 | 6/2015 |
| CN | 104732890 | 6/2015 |
| CN | 105518767 | 4/2016 |
| CN | 205264268 | 5/2016 |
| CN | 105702166 | 6/2016 |
| CN | 105741683 | 7/2016 |
| CN | 106157816 | 11/2016 |
| WO | 2016035899 | 3/2016 |

OTHER PUBLICATIONS

SIPO, First Office Action for CN Application No. 201610542623, dated Aug. 9, 2017.
WIPO, ISR for PCT/CN2017/091335, dated Aug. 29, 2017.
SIPO, Notification to Grant Patent Right for Invention for CN Application No. 201610542623, dated Sep. 25, 2017.

* cited by examiner

FLEXIBLE DISPLAY DEVICE

CROSS-REFERENCE TO RELATED APPLICATION

The present application is a continuation of U.S. application Ser. No. 16/306,595, filed Dec. 3, 2018, which is a U.S. National Stage Entry of International Application No. PCT/CN2017/091335, filed Jun. 30, 2017, which claims priority to Chinese Patent Application No. 201610542623.0, filed Jul. 8, 2016. The entire disclosures of the aforementioned applications are incorporated herein by reference.

FIELD

The present disclosure relates to a technical field of electronic devices, and more particularly, to a flexible display device.

BACKGROUND

A screen of a display device, such as a screen of an existing smart phone, is generally fixed on the device and cannot be rolled up, so that the size of the screen is greatly affected by the size of the device itself, which is not conducive to achieving a large screen of the display device.

SUMMARY

Embodiments of the present disclosure provide a flexible display device. The flexible display device includes a housing, a heel, a flexible screen component, and an alarm assembly. The housing is provided with a gap in communication with an inner cavity of the housing. The reel is located in the inner cavity of the housing and rotatably coupled to the housing. The flexible screen component has a fixed end and a stretching end arranged opposite to each other, the fixed end of the flexible screen component is coupled to the heel, and the stretching end extends out of the housing through the gap. The alarm assembly is accommodated in the housing, and the alarm assembly includes an alarm and a detector. The detector is electrically coupled to the alarm. The detector is configured to detect a stretched length of the flexible screen component, and the alarm is configured to be triggered to raise an alarm when the flexible screen component is stretched to a preset length.

BRIEF DESCRIPTION OF THE DRAWINGS

In order to illustrate technical solutions in embodiments of the present disclosure more clearly, drawings required in the embodiments will be briefly described below. Obviously, the drawings described below only show a part of embodiments of the present disclosure, and based on these drawings, other drawings can be obtained by those of ordinary skill in the art without creative efforts.

DETAILED DESCRIPTION

Technical solutions in embodiments of the present disclosure will be described clearly and completely with reference to the drawings.

The present disclosure relates to a flexible display device. The flexible display device includes a housing, a flexible screen component, and an alarm assembly. The housing defines a gap and an inner cavity, and the gap is in communication with the inner cavity. The flexible screen component has a stretching end, and the stretching end extends out of the housing through the gap. The alarm assembly is accommodated in the housing, and the alarm assembly includes an alarm and a detector. The detector is electrically coupled to the alarm. The detector is configured to detect a stretched length of the flexible screen component, and the alarm is configured to be triggered to raise an alarm when the flexible screen component is stretched to a preset length.

The present disclosure further relates to a flexible display device. The flexible display device includes a housing, a flexible screen component, and an alarm assembly. The housing defines an opening penetrating a side wall of the housing. The flexible screen component is accommodated in the housing and has a stretching end, and the stretching end extends out of the housing through the opening. The alarm assembly is provided to the housing, and the alarm assembly includes an alarm and a detector. The detector is electrically coupled to the alarm. The detector is configured to detect a stretched length of the flexible screen component, and the alarm is configured to be triggered to raise an alarm when the flexible screen component is stretched to a preset length.

The present disclosure still further relates to a flexible display device. The flexible display device includes a housing, a flexible screen component and an alarm assembly. The housing has a hollow columnar shape and defines a gap. The gap is in communication with an interior of the housing. The flexible screen component is accommodated in the housing, and the flexible screen component has a fixed end and a stretching end arranged opposite to each other, the fixed end is secured in the housing, and the stretching end extends out of the housing through the gap. The alarm assembly is accommodated in the housing, and the alarm assembly includes an alarm and a detector. The detector is electrically coupled to the alarm. The detector is configured to detect a stretched length of the flexible screen component, and the alarm is configured to be triggered to raise an alarm when the flexible screen component is stretched to a preset length.

A flexible display device according to the embodiments of the present disclosure may be any device having communication and storage functions, such as a tablet computer, a mobile phone, an e-reader, a remote controller, a personal computer (PC), a notebook computer, an in-vehicle device, a network television, a wearable device, and other network-enabled smart devices.

Figure 1:
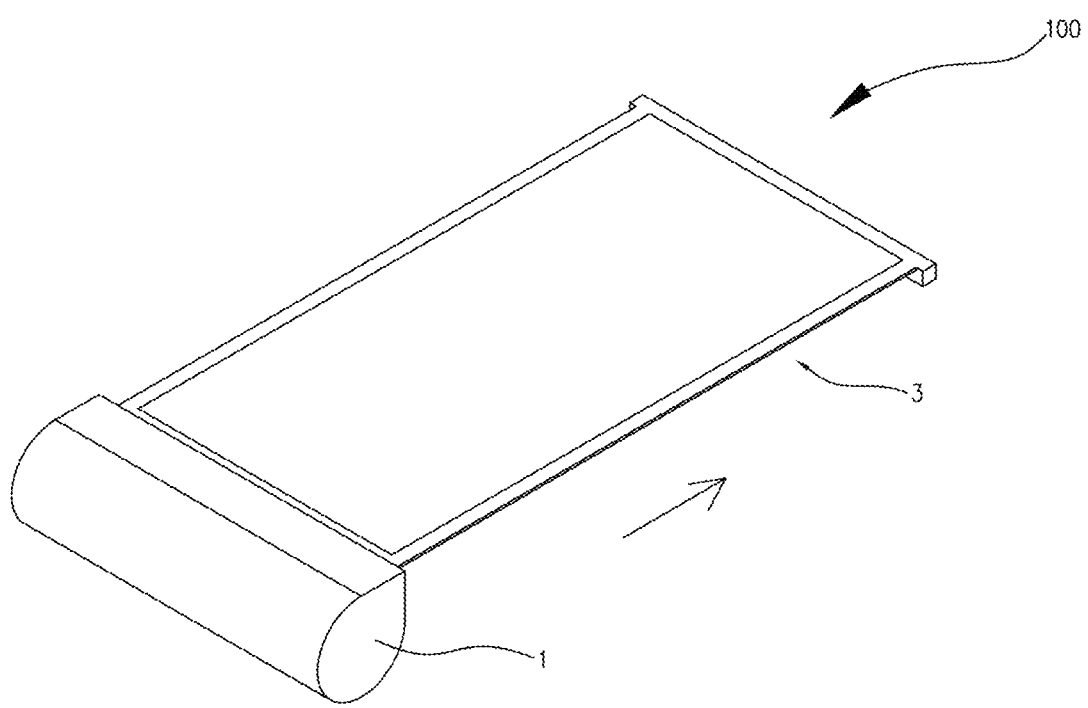
FIG. 1 illustrates a schematic view of a flexible display device in a stretched state according to an embodiment of the present disclosure.
Figure 2:
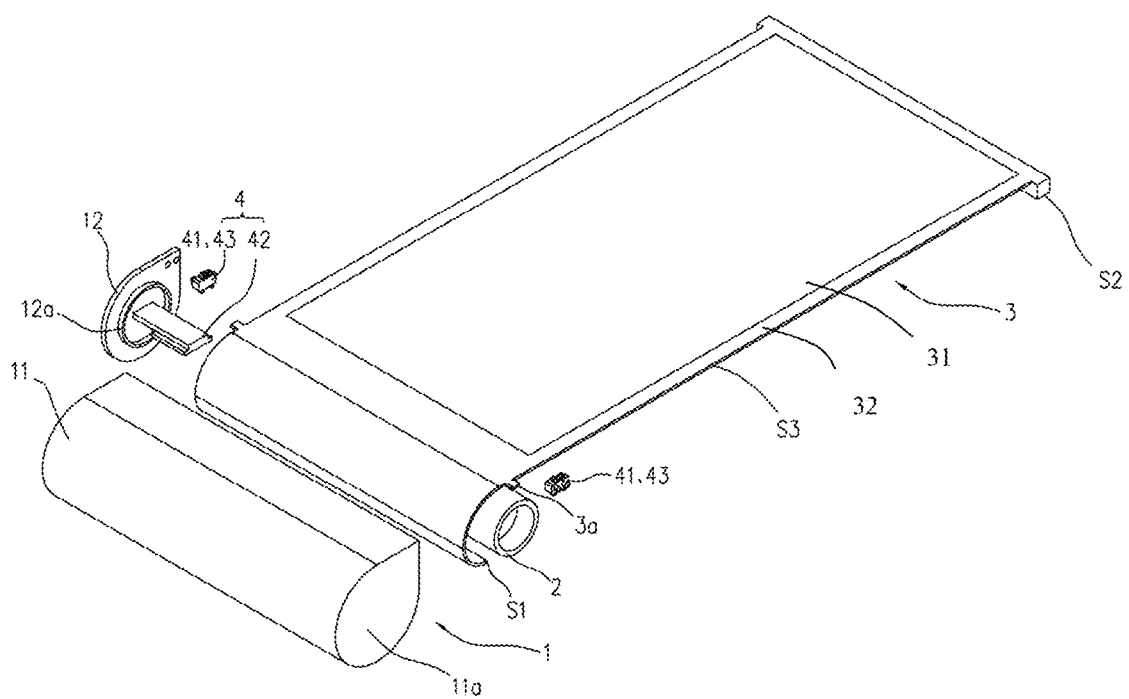
FIG. 2 illustrates an exploded view of the flexible display device of FIG. 1.

As illustrated in FIGS. 1 and 2, a flexible display device 100 is provided. The flexible display device 100 includes a housing 1, a reel 2, a flexible screen component 3 and an alarm assembly 4. The flexible screen component 3 is wound onto the reel 2, and the reel 2 is accommodated in the housing 1. The flexible screen component 3 can be stretched to an outside of the housing 1 through a gap of the housing 1. During the stretching of the flexible screen component 3, the alarm assembly 4 can alert a stretched length of the flexible screen component 3 that requires an alarm, to inform a user of a current stretched state of the flexible screen component 3.

In an embodiment, as illustrated in FIG. 2, the housing 1 has a hollow columnar shape, and has a teardrop-shaped cross section. The housing 1 is externally provided with one gap (not illustrated), and the gap is elongated and in communication with an inner cavity 11b of the housing 1, such that the flexible screen component 3 situated in the housing 1 can be stretched to the outside of the housing 1 through the gap. It could be understood that the housing 1 is made of a metal material. Certainly, in other embodiments, the housing 1 may also be pen-shaped, cylindrical or the like. Certainly, in other embodiments, the housing 1 may be made of plastics or the like.

It could be understood that the housing 1 includes a hollow cylinder body 11 and two side covers 12, the cylinder body 11 has two open ends arranged opposite to each other, and the two side covers 12 are detachably attached to the two open ends respectively, in which way the housing is constituted. The housing 1 is configured as the above detachable structure, so that components (such as the reel 2) within the housing 1 extend into the inner cavity 11b of the housing 1 through the open ends of the cylinder body 11. Certainly, in other embodiments, the housing 1 can have other structures. For example, a part of a side wall of the cylinder body 11, coupling the two open ends, is detachably coupled to the cylinder body 11, that is, the removal of this part of the side wall allows the components to be accommodated in the housing 1 to be placed in the inner cavity 11b of the housing 1, and correspondingly, the two side covers 12 can be coupled and secured to the two open ends respectively.

In an embodiment, as illustrated in FIG. 2, the reel 2 is cylindrical, and the reel 2 is accommodated in the inner cavity 11b of the housing 1 and is able to rotate in the inner cavity 11b of the housing 1, such that when the flexible screen component 3 wound around the reel 2 is stretched by an external force, the reel 2 can be rotated in the housing 1 as the flexible screen component 3 is stretched, thereby realizing the stretching of the flexible screen component 3. The reel 2 is a cylinder, and since the reel 2 generally occupies most of a volume of the inner cavity 11b of the housing 1, the reel 2 is configured as a hollow cylinder, so that components can be accommodated within the reel 2 to reduce the need for the size of the inner cavity 11b of the housing 1, which further optimizes the structure of the flexible screen component 3. It could be understood that two ends of the reel 2 are rotatably coupled to the two side covers 12 correspondingly. Correspondingly, the side cover 12 is provided with an annular protrusion 12a that protrudes from the side cover 12, and the annular protrusion 12a of one side cover 12 extends into an opening of the cylinder, so that the reel 2 is rotatably coupled to the two side covers 12. Certainly, in other embodiments, the reel 2 can be configured as a solid cylinder. Certainly, in other embodiments, the cylinder body 11 of the housing 1 can further be provided with a bearing seat, and the reel 2 is carried on the bearing seat to realize the rotation of the reel 2 in the housing 1.

In an embodiment, the flexible screen component 3 can be used for display and touch control. The flexible screen component 3 can be repeatedly bent and have elasticity. In an embodiment, the flexible screen component 3 has a fixed end S1 and a stretching end S2 arranged opposite to each other, and two side edges S3 coupled between the fixed end S1 and the stretching end S2. The fixed end S1 is secured to the reel 2, and the stretching end S2 is located outside the housing 1, so that it is convenient to pull the flexible screen component 3 out of the housing 1 by stretching the stretching end S2.

It could be understood that, in order to make the flexible screen component 3 have certain rigidity (the flexible screen component 3 is not too soft and thus is not easily deformed), and improve the user's convenience in operating the flexible screen component 3, the flexible screen component 3 includes a flexible screen 31 and a flexible support 32, and the flexible screen 31 is stacked on and attached to the flexible support 32. In an embodiment, the flexible support 32 is formed by hybrid injection molding of a thin steel sheet and silica gel, so that the flexible support 32 can be repeatedly bent and have elasticity. The flexible screen 31 is stacked on and attached to the flexible support 32, and when the flexible screen component 3 is unrolled, the flexible screen component 3 can be fixed in a certain shape due to the support of the flexible support 32, rather than be deformed easily. Certainly, in other embodiments, the flexible screen component 3 can be composed of a flexible screen 31. Alternatively, the flexible support 32 can be replaced with a thin silicone sheet.

It could be understood that the flexible screen component 3 has a thickness of 5 mm, or the flexible screen component 3 has a thickness of 6 mm, or the flexible screen component 3 has a thickness of 5 mm to 6 mm. The inventors have found through a large number of experiments that limiting the thickness of the flexible screen component to 5 mm to 6 mm can facilitate the winding of the flexible screen component 3 and further improve the reliability of the flexible display device 100.

Figure 3:
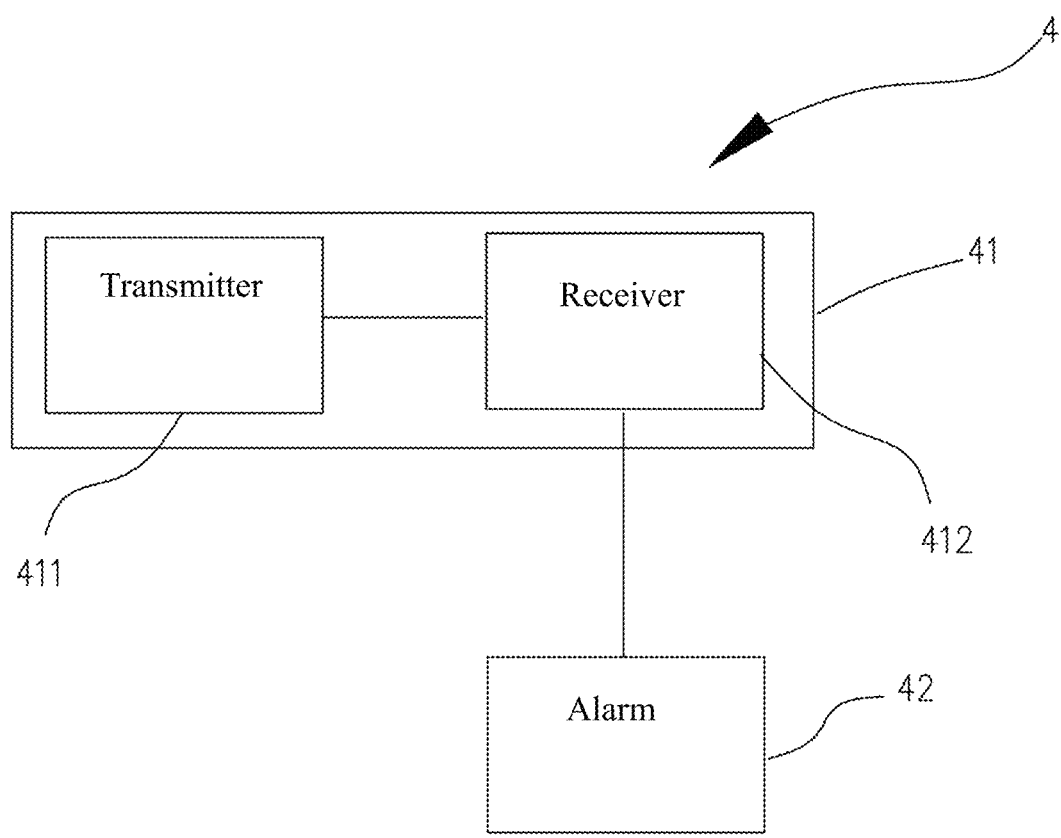
FIG. 3 illustrates a schematic view of an alarm assembly in the flexible display device of FIG. 1.

In an embodiment, as illustrated in FIGS. 2 and 3, the alarm assembly 4 is accommodated in the housing 1, and the alarm assembly 4 includes an alarm 42 and a detector 41, 43 electrically coupled to the alarm 42. The detector 41, 43 detects the stretched length of the flexible screen component 3, and when the detector 41, 43 detects the flexible screen component 3 is stretched to a preset length, the alarm 42 is triggered to raise an alarm.

In an embodiment, the alarm 42 may be an audible alarm, or the alarm 42 may be an audible and visual alarm, or the alarm 42 may be a vibrator. The alarm 42 can be provided to a circuit board, and the circuit board provided with the alarm 42 is secured to one side cover 12 and extends into the interior of the reel 2. When the alarm 42 is in wired electrical connection with the detectors 41, 43, it is also possible to route within the cylinder of the reel 2, that is, a wire between the alarm 42 and the detector 41, 43 is located within the reel 2, thereby further optimizing the structure of the flexible screen component 3. Certainly, in other embodiments, the alarm 42 can also be provided correspondingly in the light of actual situations, and for example, the alarm 42 is placed in other positions of the housing 1.

In an embodiment, the detector 41, 43 have a variety of structures. The cooperation between the detector 41, 43 and the alarm 42 can achieve the purpose of reminding the user to prevent the damage of the flexible screen component 3.

In an embodiment, as illustrated in FIG. 3, the detector 41 includes a transmitter 411 and a receiver 412. The transmitter 411 is provided to the side edge S3. The receiver 412 is electrically coupled to the transmitter 411 and the alarm 42 separately. When the flexible screen component 3 is stretched to the preset length, the receiver 412 receives a signal transmitted by the transmitter 411, and the alarm 42 raises the alarm.

In an embodiment, as illustrated in FIGS. 2 and 3, since the transmitter 411 is provided to the side edge S3 of the flexible screen component 3, the transmitter 411 will rotate along with the side edge S3 of the flexible screen component 3 when the flexible screen component 3 is stretched. When the transmitter 411 rotates to a certain position, a distance between the transmitter 411 and the receiver 412 can satisfy that the signal transmitted by the transmitter 411 can be received by the receiver 412, and the receiver 412 sends the received signal to the alarm 42, based on which signal, the circuit board on the alarm 42 sends an alarm signal to trigger the alarm 42 to raise the alarm, so as to remind the user of the current stretched condition of the flexible screen component 3. It could be understood that, the position of the receiver 412 is correspondingly provided according to an actually required alarm position. During the stretching of the flexible screen component 3, the later the receiver 412 receives the signal of the transmitter 411, the longer the current stretched length of the flexible screen component 3 is when the alarm 42 sends the alarm signal, and the more accurately the user can be reminded that the flexible screen component 3 is nearly stretched in place, thereby avoiding the damage of the flexible screen component 3 due to further stretching. The above-mentioned alarm assembly 4 completely utilizes the transmission of electrical signals, and has less limitation on the position of the components in the alarm assembly 4.

Figure 4:
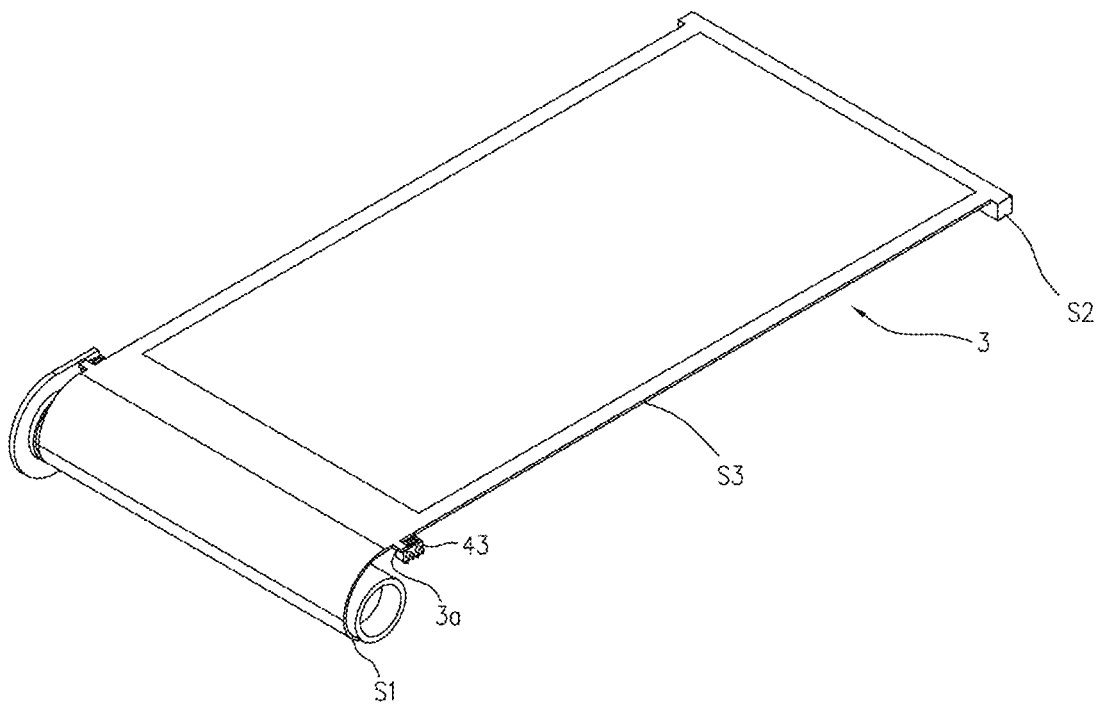
FIG. 4 illustrates a schematic view of another alarm assembly in the flexible display device of FIG. 1, in which the alarm assembly is provided in a housing.

In an embodiment, as illustrated in FIGS. 2 and 4, the detector 43 is located outside the reel 2. The detector 43 detects a space between a limiting portion 3a and the detector 43 during the stretching of the flexible screen component 3, to obtain the stretched length of the flexible screen component 3. The limiting portion 3a is provided to the side edge S3 and adjacent to the fixed end S1. When the detector 43 detects that the flexible screen component 3 is stretched to the preset length, the alarm 42 raises the alarm. It could be understood that the space between the detector 43 and the limiting portion 3a is correspondingly set according to actual situations. For example, the space between the detector 43 and the limiting portion 3a may be zero, or the space between the detector 43 and the limiting portion 3a may be a certain distance.

The limiting portion 3a is a limiting protrusion provided to and protruding from the side edge S3.

Figure 5:
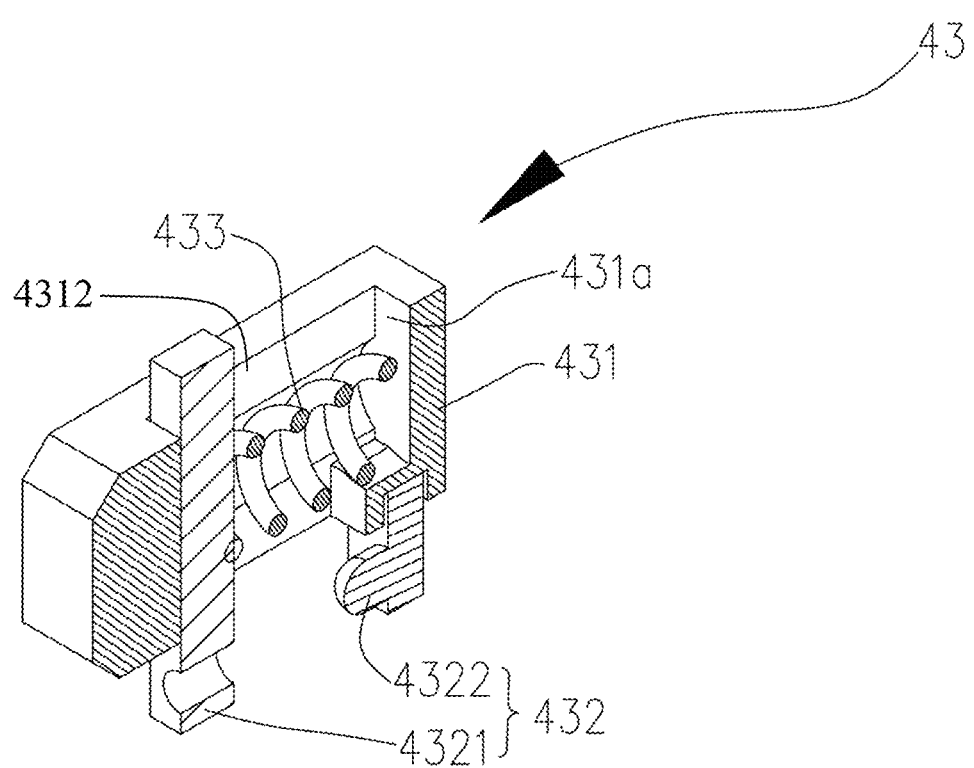
FIG. 5 illustrates a schematic view of an internal structure of the alarm assembly in FIG. 4.

It could be understood that, as illustrated in FIGS. 4 and 5, the detector 43 includes an outer casing 431, a switch assembly 432, and a spring 433. The outer casing 431 is located outside the reel 2, and the outer casing 431 has one protruding hole 4312 and an accommodating cavity 431a in communication with the protruding hole 4312. The switch assembly 432 and the spring 433 are located in the accommodating cavity 431a. The switch assembly 432 includes a switch 4321 and a switch cap 4322. The spring 433 is elastically coupled between the switch 4321 and the switch cap 4322. An end of the switch 4321 protrudes through the protruding hole 4312. When the flexible screen component 3 is stretched until the limiting portion 3a abuts against the end of the switch 4321, and the limiting portion 3a pushes the switch 4321 until the switch 4321 is electrically coupled to the switch cap 4322, the alarm 42 raises the alarm. In an embodiment, the outer casing 431 is secured to the side cover 12 and located outside the reel 2. The outer casing 431 is a rectangular casing defining the accommodating cavity 431a therein, and two openings of the accommodating cavity 431a arranged opposite to each other are located at upper and lower ends of the outer casing 431 correspondingly to form two protruding holes 4312. Two ends of the switch 4321 protrude from the two protruding holes 4312 respectively. During the stretching of the flexible screen component 3, the limiting portion 3a rotates correspondingly as the flexible screen component 3 is stretched, until the limiting portion 3a is stretched to abut against the end of the switch 4321. In such a case, if the stretching of the flexible screen component 3 continues, the limiting portion 3a pushes the switch 4321 against an elastic force of the spring 433 to slide until the switch 4321 is electrically coupled with the switch cap 4322. At this time, the alarm 42 raises the alarm to inform the user that the flexible screen component 3 has already been stretched in place and cannot be further stretched. The cooperation between the detector 43 and the limiting portion 3a can inform the user of the current stretched state of the flexible screen component 3 by the damping sense of the elastic member when the flexible screen component 3 is nearly stretched in place; moreover, when the flexible screen component 3 is in a fully stretched state, since the switch 4321 has been electrically coupled to the switch cap 4322, the limiting portion 3a cannot continue to advance, and hence the flexible screen component 3 is prevented from being further stretched, thereby providing better protection for the flexible screen component 3 and enhancing the reliability of the flexible display device 100. Certainly, in other embodiments, the detector is a pressure sensor, and the alarm raises the alarm when the flexible screen component is stretched until the limiting portion abuts against the detector.

It could be understood that, in some embodiment, only the detector 41 can be provided, or only the detector 43 can be provided, or the detector 41 and the detector 43 can be provided at the same time.

It could be understood that one or two or more detectors 41 can be provided, or one or two or more detectors 43 can be provided. When two detectors 41 are provided, the two detectors 41 can be electrically coupled to one alarm 42 at the same time, and correspondingly, two transmitters 411 are provided to two side edges S3 respectively. When two detectors 43 are provided, the two detectors 43 can be electrically coupled to one alarm 42 at the same time, and correspondingly, the side edges S3 are provided with two limiting portions 3a to cooperate with the two detectors 43 correspondingly.

When the flexible display device 100 needs to be stretched, the stretching end S2 is pulled so that the flexible screen component 3 extends out of the housing 1 through the gap; when the flexible screen component 3 is nearly stretched in place, which will be detected by the detector 41, 43, the alarm 42 raises the alarm to inform the user of the current stretched state of the flexible screen component 3, thereby avoiding damaging the flexible screen component 3 due to further stretching of the flexible screen component 3. For the flexible display device 100 according to the embodiments of the present disclosure, the flexible screen component 3 is accommodated in the housing 1, and the flexible screen component 3 can be flexibly deformed under the action of the external force, that is, exhibit a bent or flattened state, such that the housing 1 of the flexible display device 100 is less affected by the size of the flexible screen component 3, that is, the housing 1, for accommodating the flexible screen component 3, of the flexible display device 100 can have a smaller size, but the flexible display device 100 can have a larger display area. Moreover, for the flexible display device 100, the alarm assembly 4 is provided in the housing 1, and when the flexible screen component 3 is in the fully stretched state, the user can be informed and hence will not further stretch the flexible screen component 3, thereby avoiding the damage of the flexible screen component 3, and improving the reliability of the flexible display device 100.

The above are some embodiments of the present disclosure. It should be noted that those skilled in the art can make improvements and modifications without departing from the principles of the present disclosure, and these improvements and modifications are also within the protection scope of the present disclosure.

What is claimed is:

1. A flexible display device, comprising:
   a housing provided with a gap in communication with an inner cavity of the housing;
   a reel located in the inner cavity of the housing and rotatably coupled to the housing;
   a flexible screen component having a fixed end and a stretching end arranged opposite to each other, the fixed end of the flexible screen component being secured to the reel, and the stretching end extending out of the housing through the gap; and
   an alarm assembly accommodated in the housing, and comprising an alarm and a detector electrically coupled to the alarm, the detector being configured to detect a stretched length of the flexible screen component, and the alarm being configured to be triggered to raise an alarm when the flexible screen component is stretched to a preset length;
   wherein the flexible screen component has a side edge coupled between the stretching end and the fixed end; the side edge is provided with a limiting portion protruding from the side edge and adjacent to the fixed end; the detector is located outside the reel; the detector detects a space between the limiting portion and the detector during the stretching of the flexible screen component, to obtain the stretched length of the flexible screen component, and when the flexible screen component is stretched to the preset length, the alarm is triggered to raise the alarm.

2. The flexible display device according to claim 1, wherein the limiting portion is a limiting protrusion provided to and protruding from the side edge.

3. The flexible display device according to claim 2, wherein the housing comprises a cylinder and two side covers, the cylinder has two open ends arranged opposite to each other, and the two side covers are provided to the two open ends correspondingly; the reel has two ends rotatably coupled to the two side covers correspondingly; and the detector is secured to the side cover.

4. The flexible display device according to claim 1, wherein the detector is a pressure sensor, and the alarm is triggered to raise the alarm when the flexible screen component is stretched until the limiting portion abuts against the detector.

5. The flexible display device according to claim 4, wherein the housing comprises a cylinder and two side covers, the cylinder has two open ends arranged opposite to each other, and the two side covers are provided to the two open ends correspondingly; the reel has two ends rotatably coupled to the two side covers correspondingly; and the detector is secured to the side cover.

6. The flexible display device according to claim 1, wherein the detector comprises:
   an outer casing located outside the reel, and having one protruding hole and an accommodating cavity in communication with the protruding hole;
   a switch assembly accommodated in the accommodating cavity and comprising a switch and a switch cap, the switch having an end protruding through the one protruding hole; and
   a spring accommodated in the accommodating cavity and coupled between the switch and the switch cap;
   when the flexible screen component is stretched until the limiting portion abuts against the end of the switch, and the limiting portion pushes the switch until the switch is electrically coupled to the switch cap, the alarm raises the alarm.

7. The flexible display device according to claim 6, wherein the housing comprises a cylinder and two side covers, the cylinder has two open ends arranged opposite to each other, and the two side covers are provided to the two open ends correspondingly; the reel has two ends rotatably coupled to the two side covers correspondingly; and the detector is secured to the side cover.

8. The flexible display device according to claim 1, wherein the housing comprises a cylinder and two side covers, the cylinder has two open ends arranged opposite to each other, and the two side covers are provided to the two open ends correspondingly; the reel has two ends rotatably coupled to the two side covers correspondingly; and the detector is secured to the side cover.

9. The flexible display device according to claim 8, wherein the reel is a cylinder, and the alarm is secured to one of the side covers and extends into the reel.

10. The flexible display device according to claim 1, wherein the housing comprises a cylinder and two side covers, the cylinder has two open ends arranged opposite to each other, and the two side covers are provided to the two open ends correspondingly; the reel has two ends rotatably coupled to the two side covers correspondingly; and the detector is secured to the side cover.

11. The flexible display device according to claim 1, wherein the housing comprises a cylinder and two side covers, the cylinder has two open ends arranged opposite to each other, and the two side covers are provided to the two open ends correspondingly; the reel has two ends rotatably coupled to the two side covers correspondingly; and the detector is secured to the side cover.

12. The flexible display device according to claim 1, wherein the alarm is an audible alarm; or the alarm is an audible and visual alarm; or the alarm is a vibrator.

13. The flexible display device according to claim 1, wherein the flexible screen component comprises a flexible screen and a flexible support, and the flexible screen is stacked on and attached to the flexible support.

* * * * *